Oct. 31, 1967  E. W. GRIESE, JR  3,349,739
PRODUCTION OF FORMED METAL FOIL CONTAINERS
Filed Sept. 25, 1963  3 Sheets-Sheet 1
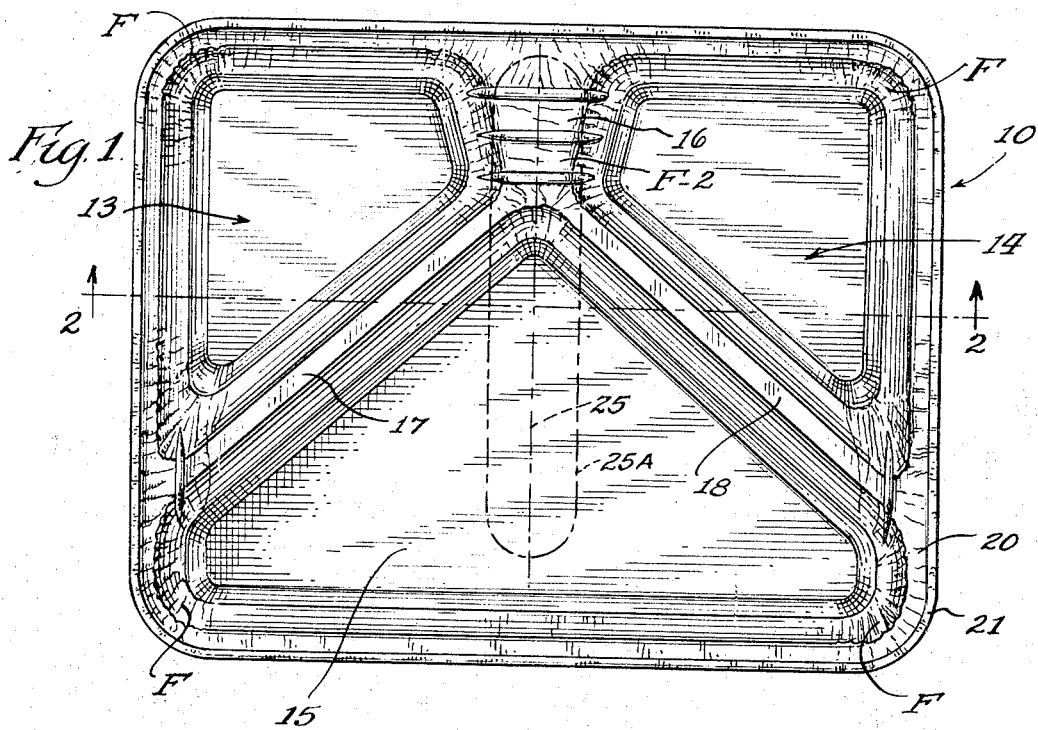
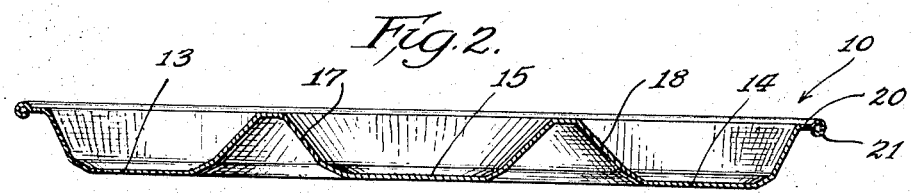
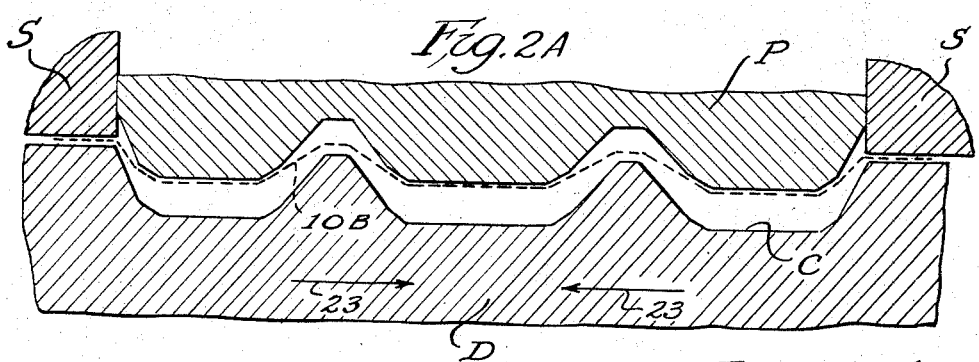
Inventor
Elmer W. Griese, Jr.
By Mann, Brown & McWilliams.
Attys.

Oct. 31, 1967  E. W. GRIESE, JR  3,349,739
PRODUCTION OF FORMED METAL FOIL CONTAINERS
Filed Sept. 25, 1963  3 Sheets-Sheet 2

Inventor
Elmer W. Griese, Jr.
By Mann, Brown & McWilliams
Attys.

Oct. 31, 1967     E. W. GRIESE, JR     3,349,739
PRODUCTION OF FORMED METAL FOIL CONTAINERS
Filed Sept. 25, 1963     3 Sheets-Sheet 3
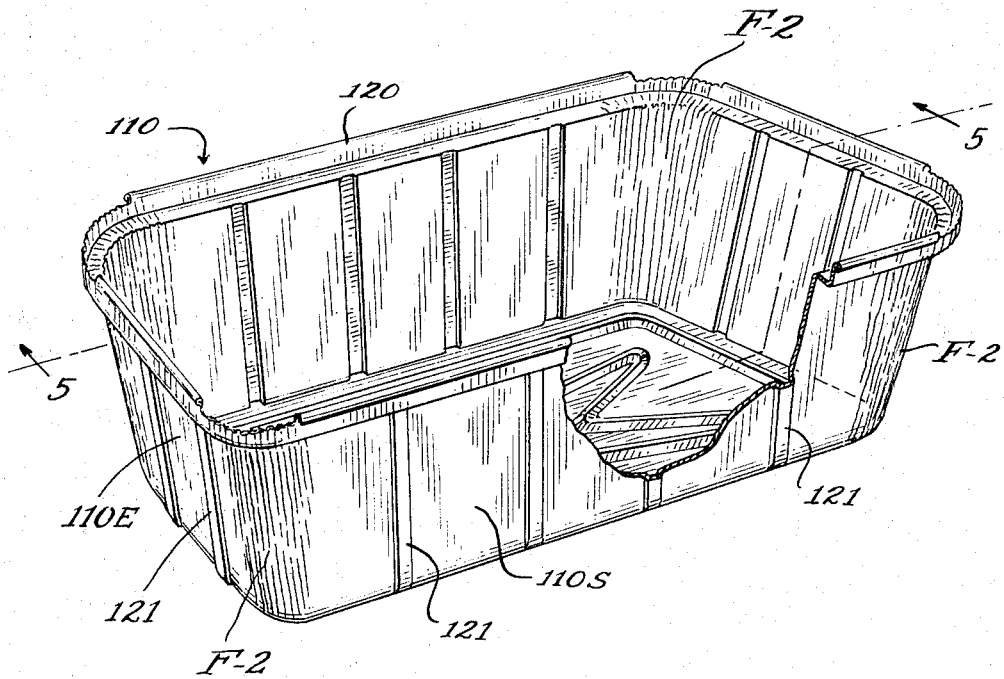
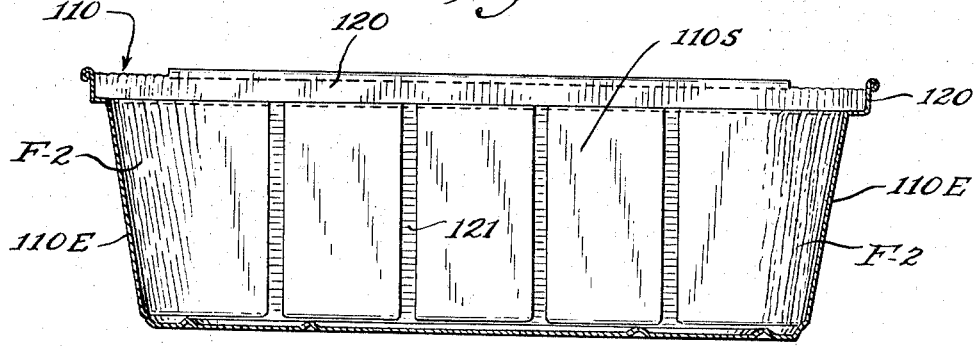
Inventor
Elmer W. Griese, Jr.
By Mann, Brown & McWilliams
Attys.

United States Patent Office 3,349,739
Patented Oct. 31, 1967

3,349,739
PRODUCTION OF FORMED METAL FOIL
CONTAINERS
Elmer W. Griese, Jr., Skokie, Ill., assignor to Ekco
Products, Inc., a corporation of Illinois
Filed Sept. 25, 1963, Ser. No. 311,467
1 Claim. (Cl. 113—120)

This invention relates to the production of metal foil containers such as pans, compartmented dinner trays and the like of the kind that are produced by pushing a flat metal foil blank into a die cavity to reduce the blank size and form a container in which portions of the upstanding walls, edge flanges and perhaps other parts assume a random wrinkled or folded formation.

Such formed metal foil containers have been met with great commercial success, and have been produced and marketed in many different shapes and sizes for at least ten years by many companies. It is estimated that currently such containers are being made and sold at a rate of well over one hundred million per year. Being employed generally as single use products, the attainment of a low production cost has been considered to be an important and controlling factor and this has resulted in most instances in the use of metal foil of the very minimum thickness. Thus, in the highly competitive market in which such containers are used there must be a constant compromise between the cost and the strength or sturdiness of the containers, and because of this, objection is often raised as to lack of strength and rigidity of said containers.

In view of the foregoing it is the primary object of this invention to provide a new and improved method for producing formed metal foil containers whereby the factors of cost and container strength may be improved and may be advantageously controlled and related, and more specifically it is an object of this invention to enable such containers to be produced in such a way that the market demands established for such containers may be more easily met.

Other important objects of this invention are to enable such formed metal foil containers to be produced in the same general shapes as heretofore employed but having an improved appearance; to enable increased strength and rigidity to be attained in such containers; to enable the areas of folding and crimping to be controlled so as to form such containers with increased strength and stiffness in most of the flat wall areas thereof, and a related object is to enable the foregoing to be accomplished at a reasonable cost.

Other and further objects of the present invention will be apparent from the following description and claim, and are illustrated in the accompanying drawings, which, by way of illustration show the way in which the present invention and the principles thereof are applied to certain commonly used containers, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view of a formed metal foil dinner tray that may be made under the present invention;

FIG. 2 is a vertical sectional view taken along the line 2—2 of FIG. 1;

FIG. 2A is a schematic view showing the forming operation at an intermediate stage;

FIG. 4 is a perspective view of a formed metal foil pan that may be made under the present invention;

FIG. 5 is a vertical sectional view taken along the line 5—5 of FIG. 4;

For purposes of disclosure, the method of the present invention will be described as utilized and practiced in the production of two of the more widely used forms or shapes of formed metal foil containers, and the principles and practice of the method will be described in such terms and such detail as to enable those skilled in the art to apply the method to containers of the other forms or shapes. Thus, in FIGS. 1 and 2, a formed metal foil dinner tray 10 is illustrated, while in FIGS. 4 and 5, a formed metal foil baking pan 110 is shown, and these containers 10 and 110 are in most respects of conventional form or shape and may advantageously be produced by the method of this invention.

Formed metal foil containers, such as the dinner tray 10 or the pan 110, have been produced through the use of dies such as the die set illustrated schematically in FIG. 2A in which the punch P pushes a flat metal foil blank 10B into the cavity C of a die D. As this operation proceeds, the border portions of the blank 10S are held flat by the usual pressure pad S while these border portions are pulled inwardly and the blank 10B is formed to the desired shape. To prevent splitting or rupture of the metal in such prior forming operations, it has been the practice to use metal foil stock that has been annealed after the final rolling operation. Under such prior procedure it has been possible to produce the containers at high production rates and with assurance that the metal will not be torn or split in the forming operation.

Upon review and study of such prior containers, the production methods and costs involved, and the objections and complaints based particularly on lack of strength or rigidity, I have discovered that such objections may be to a large extent obviated by adoption of a different manufacturing procedure which enables the inherent strength of the basic foil material to be utilized to substantially its full extent to increase the strength and rigidity of the containers while still assuring formation of the containers without tearing or breaking of the metal. Thus, under and in accordance with this invention, the metal foil is used in its hard or unannealed form so as to possess maximum strength and rigidity, and according to the form and complexity of the container to be formed, is annealed in selected and relatively confined areas that are positionally related to the container form in such a way as to prevent splitting or tearing in those areas where maximum stress is developed during forming. The preferred way in which this is accomplished will now be set forth in detail.

Thus, under the present invention the forming dies employed to produce a container of a particular form, size and the like may be the same as the forming dies as heretofore used, and the method of the present invention involves the selection and treatment of the metal foil in a particular relation to such dies and the forming operations that are involved.

Figure 3:
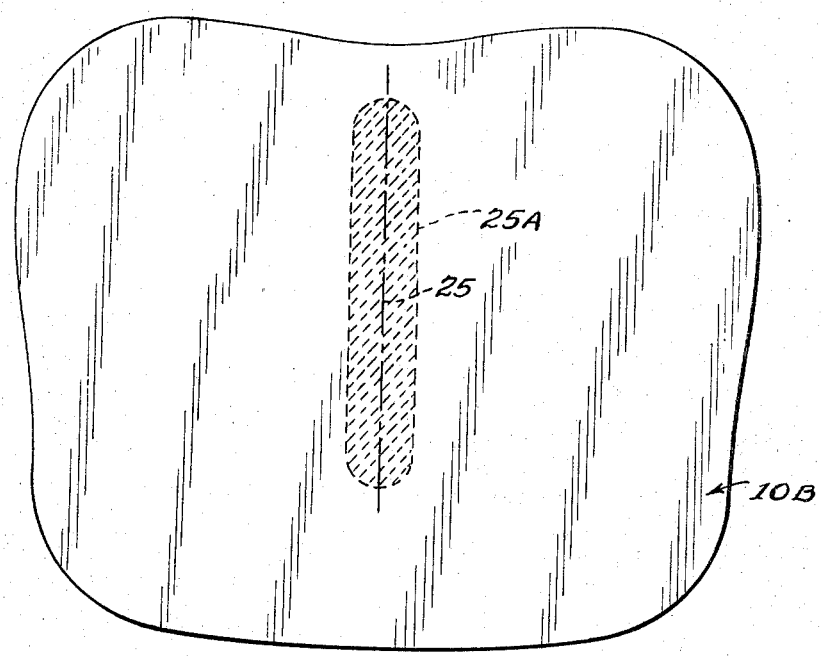
FIG. 3 is a plan view of the blank employed.

The usual forming dies utilized in producing the dinner tray 10 are used to form a shaped metal foil blank 10A of the form or outline illustrated in FIG. 3, and in the relative approaching movement of the dies, the metal of the blank 10A is pushed into the die cavity while at the same time the border portions are pulled inwardly as required, the sloping walls are bent toward their final positions, and the excess metal areas at the junctures of the sloping walls, and in top wall portions or flanges that are joined to the sloping walls, are formed into folds that vary as to size and spacing according to the form and depth of the container. Considered specifically with reference to FIGS. 1 to 3 of the drawings, the formation of the dinner tray 10 from the blank 10B forms a pair of small compartments 13 and 14 along one of the long edges of the tray and a larger single compartment 15 along the other long edge of the tray, a short dividing structure 16 separating the compartments 13 and 14, and two angularly diverging dividing structures 17 and 18 extending from the dividing structure 16 to the opposite ends to separate the large compartment 15 from the respective small compartments 13 and 14.

The tray 10 has a narrow projecting flange 20 with an outer curl 21 about its entire outer edge, and the flange 20 is connected to sloping walls that define the other or outer sides of the several compartments. The dividing structures 16, 17 and 18 have similar sloping walls, so that all of the sides of the several compartments are defined by sloping wall structures. All of the top walls of the dividing structures are joined together so that these top walls and the flange 20 are in a common upper plane while the bottom walls of the several compartments are in a common lower plane.

At the corners of the several compartments, the excess metal that is present is formed into folds F that extend generally parallel and in a generally upward direction so that the several compartments may be formed without drawing of the metal foil. Similarly, folds F-2 are formed in the top wall of the dividing structure 16 and in the flanges 20 and curls 21 adjacent the corner folds F, and to a limited extent, the portions of the dividing structure 17 and 18 that are adjacent to the end walls of the tray 10 have folds formed therein which in effect dispose of the excess metal that is present at these points.

As pointed out hereinabove the metal of the blank is pulled inwardly during a tray forming operation, and the precise inward pulling or shifting movements of the blank is determined in a large measure by the particular form and design of the tray or container that is being made. In any event, as illustrated diagrammatically in FIG. 2A of the drawings, the metal foil of the blank 10B must be pulled or shifted in a direction indicated by the arrows 23 to provide metal for the sloping walls of the compartments, and thus as the forming operation proceeds, the bends that are formed in the blank become gradually more severe. Keeping in mind that there must be movement toward the general center of the forming dies, the increase in the severity of the bends gradually builds up resisting forces of such magnitude that when the punch approaches fairly close to its final or home position, there can be no further inward movement of at least certain portions of the metal of the blank. As a result there is a tendency to stretch the metal foil at one or more points or areas in the blank. In the usual method of forming trays or containers from metal foil, the fact that the metal employed is annealed enables the inward pulling of the metal of the blank to proceed in such a way that the forming operation may be completed without tearing of the metal foil.

I have discovered that the forming of a tray or container from metal foil that is in its original hard or unannealed state may be performed to substantially its full extent without breaking or tearing of the metal, and I have found that when this hard and extremely strong metal is employed, the final stretching action that tends to tear or split the metal is concentrated in one or more areas of the blank. The size and location of these areas of maximum stress may of course be determined by stress analysis, but I prefer to make this determination experimentally in the following manner.

Thus, under the present invention a normal or conventionally designed die set for forming a particular container is operated through a forming cycle on a blank made of metal foil having hardness such that there will be an eventual tearing of the metal in one or two areas of the blank. The particular location and size of the tears that result depends in a great measure on the design or shape of the container and particularly on its depth. As applied to the dinner tray 10 shown in FIGS. 1 to 3, such an operation results in a tearing of the metal along a line 25 located midway between and parallel to the opposite ends of the container, and it will be apparent that the tearing tendency is confined to the area that is located between the two dividing structures 17 and 18.

Thus by the performance of a forming operation on a relatively hard metal foil blank, it is determined where the maximum stress is applied in the final portions of the forming operation, and under the present invention, a similar blank is then annealed in a limited area 25A that extends for a substantial distance on opposite sides of the location of the line 25 as will be evident in FIG. 3. Thus on opposite sides of the line 25 areas of the metal are provided that, because of the annealing, are relatively soft and may be stretched to a limited extent during the final portions of the forming operation.

The selectively annealed blank 10B is then subjected to a forming operation with the same dies, and through this procedure, the final portions of the forming operation serve merely to stretch the metal within the area 25A to a slight extent and thus the container is produced without splitting or tearing.

Utilizing the method above described, it will be evident that substantially all of the portions of the container 10 have the original high strength that is embodied in the hard metal foil sheet that has been used, and this high strength area of the container includes all of the walls that border the container, a large portion of the bottom walls of the compartments, the flange 20 and the curl 21. The net result of this method of production is that for any particular metal thickness of gauge, the container is stronger and more rugged than containers that are made under conventional practices. Another factor of importance is that the hard metal foil is produced without the usual full area annealing operation, and hence a reduction in cost is provided which is not offset to any appreciable extent by the cost of annealing relatively small areas such as the area 25A of FIG. 3.

As above pointed out, the method of the present invention may also be used to form containers of other shapes, such as the relatively deep pan 110 that is shown in FIGS. 4 and 5 of the drawings. The pan 110 comprises a bottom wall having upwardly sloping end walls 110E and side walls 110S that are joined in rounded corners and have angularly related top flanges 120 of the usual form. The rounded corners that join the side and end walls have generally parallel folds F-2 therein that result from the nature of the forming operations, and these folds F-2 extend upwardly through the flange portion 120 at the corners of the container. It will be noted that the side and end walls of the container 110 have vertically extending spaced ribs 121 formed therein, so that the space between these ribs is provided by a plurality of spaced panels that cooperate with the ribs 121 in forming the side and end walls.

Figure 6:
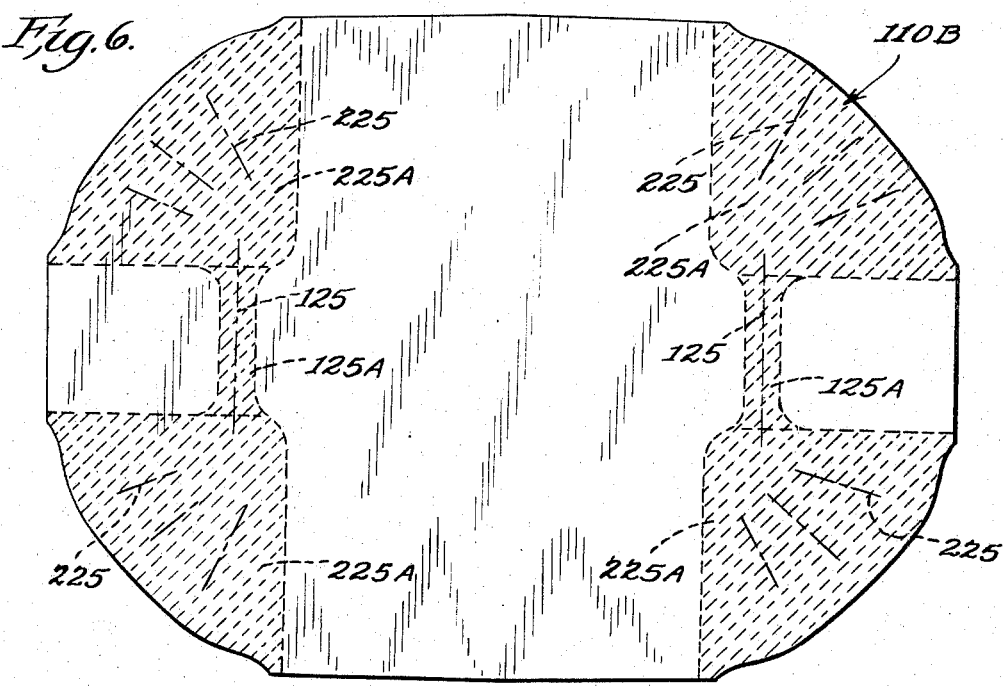
FIG. 6 is a plan view of the blank employed in producing the container of FIGS. 4 and 5.

With respect to the container 110, the same general mode of determination is used in locating the areas where maximum stress will be produced in the forming operation. Thus, a shaped blank made from a sheet of hard or unannealed metal foil of the desired thickness is formed by use of appropriate dies to produce a container or pan 110, and here again the fact that the metal foil is not annealed causes the metal to split at several points which serve to identify the location and the extent of the areas of maximum stress. In a blank 110B, as shown in FIG. 6, the relatively great depth of the pan 110 usually causes splitting at one or more lines 225 located in the four corner portions of the blank which are bent into rather severe or deep folds as the rounded corners of the container are formed. Similarly, in the portions of the blank 110B that are to form the end walls of the pan, it is found that the hard metal is split along lines 125 that are parallel to and spaced slightly upwardly from the bottom edges of the end walls 110E of the pan. The lines 225 and 125 thus define those areas where maximum stress is encountered in the forming operation.

Having determined the areas where maximum stress is to occur, another blank 110B of hard metal is annealed in selected local areas 125A that extend on both sides of the locations of the split lines 125, and segmental portions 225A that are in effect located between adjacent end and side walls are also annealed. As thus treated, the blank has the selected areas thereof formed from annealed metal so that it may readily stretch to the desired extent during a forming operation, and all of the other areas of the blank 120B have their original high strength and rigidity. This selectively annealed blank 110B is then formed on the same dies, and it is found that this blank is shaped to the desired form without splitting. A further desirable result that follows from this treatment of the blank is that the folds, such as the folds F-2 that are necessarily produced as the edges of the blanks are pulled inwardly, and confined substantially to the areas 225A of the blank, and the metal of the side walls 110S and the end walls 110E of the metal remains in a flat and substantially unwrinkled form so that the pan 110 has a more desirable and attractive appearance. Further, it is found that the bottom wall and the side and end walls which still possess the original strength and rigidity serve to impart unusual rigidity to the pan as a whole so that as compared to prior pans, the pan that is formed by the method of this invention is more desirable in a commercial sense.

Thus under the present invention, the blank that is to be used is made of a hard or unannealed metal and is annealed in limited areas that are positionally related to the particular form and design of the container that is to be produced. The annealed blank is of course introduced into the forming dies in a particular relationship such that these selectively annealed areas of the blank will take the stretching that is necessary in the forming operation, while the major portions or areas of the blank which are unannealed retain their original strength and rigidity and cooperate to produce a container that has more desirable characteristics of strength and ruggedness than the prior containers of the same general form.

Thus, while preferred embodiments of the invention have been illustrated herein, it is to be understood that changes and variations may be made by those skilled in the art without departing from the spirit and scope of the appended claim.

I claim:

In the production of metal foil containers having a bottom wall with upstanding sloping side walls bordering the bottom wall and meeting in and joined by rounded corner portions in which the metal foil is formed into folds, the method of enabling increased strength and rigidity to be attained in the container for any selected foil thickness which comprises providing a flat metal foil blank of the selected thickness and having a hardness such that the forming operation will tend to stretch and split where substantial stretching forces are effective in the forming operation, subjecting such a blank to a forming operation wherein a container will be formed with one or more split lines where excessive stretching forces have been exerted, annealing limited areas of a second blank on both sides of the location defined by any such split line, and then subjecting the second blank to the desired forming operation.

References Cited

UNITED STATES PATENTS

| | | | |
|---|---|---|---|
| 1,433,161 | 10/1922 | Smith et al. | 72—364 |
| 2,356,457 | 8/1944 | Gonda | 72—364 |
| 2,977,917 | 4/1961 | Lyon | 113—116 |
| 3,144,974 | 8/1964 | Eichner et al. | 113—120 |
| 3,158,119 | 11/1964 | Thaller et al. | 72—364 |

RICHARD J. HERBST, *Primary Examiner.*

G. P. CROSBY, *Assistant Examiner.*